Figure 1:
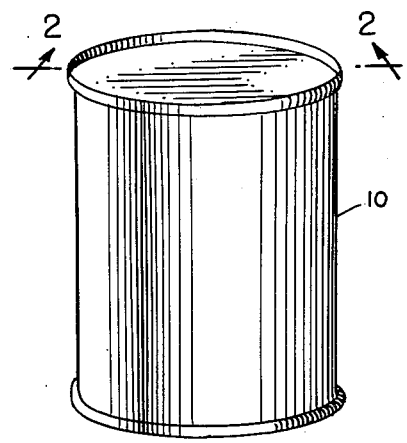

July 6, 1965  V. J. KUBALA ETAL  3,193,394
CANNING BARBECUED RIBS
Filed April 3, 1963

INVENTORS:
VLADIMIR J. KUBALA
ARTHUR A. RIDDLESWORTH
BY
Carl C. Batz
ATT'YS

3,193,394
CANNING BARBECUED RIBS

Vladimir J. Kubala, Oak Lawn, and Arthur A. Riddlesworth, Lombard, Ill., assignors to Armour and Company, Chicago, Ill., a corporation of Delaware
Filed Apr. 3, 1963, Ser. No. 270,369
2 Claims. (Cl. 99—187)

This invention relates to canned barbecued ribs, and more particularly to a process for canning barbecued meat-carrying ribs in stabilized sauce and juices.

Efforts to can barbecued ribs, such as back ribs, spareribs, etc., have been confronted with serious problems. Preliminary processing steps have resulted in a substantial loss of moisture, and later when water is added to the barbecue sauce and the ribs are cooked with the sauce in a sealed can, the water leaches out minerals, aroma and flavor components, and fats from the meat, and the resultant product is flaccid and has a cooked-out taste. Further, when the contents of the can are being heated, the sauce flows off the ribs and the barbecue sauce does not cook into the meat. Further, when the can is opened, it is found that the sauce material, juices and fat tend to stratify and to separate, producing a product which is non-uniform and unattractive in appearance. The flowing of the sauce away from the ribs during heating results in a substantial waste.

The practice in early attempts to prepare canned barbecued ribs was to cure the ribs in a pickle solution and, after curing, to hang the ribs on combs and process them in a smokehouse for periods of six hours or more, and in this period in which smoke is added to the product, a considerable amount of the moisture or juices of the meat are removed. After this operation, the ribs, together with a barbecue sauce which is diluted with at least 44% of free water to give the desired fluidity, are placed in a can which is sealed and then heated to cook the meat carried by the ribs. When the product reaches the consumer, the can is opened and the ribs and sauce removed and heated. The meat by reason of its loss of the natural juices containing minerals, flavor components, etc., is not pleasing to the taste, and the barbecue sauce, which consists principally of water mixed with tomato paste and added flavoring materials, tends to flow away from the rib pieces during the heating step and tends to stratify and to be unstable in the final product.

A primary object of the present invention is to provide a process for the canning of barbecued ribs in which the sauce and juices are stabilized against separation or stratification and do not flow away from the ribs during the heating of the product. A further object is to provide a process for canning barbecued ribs in which free water is largely eliminated from the sauce formula, and the final dilution of the heavy sauce which is deficient in moisture is accomplished by the natural juices to stabilize the sauce and to render it uniform in the final product. A still further object is to provide a process for retaining the natural juices in the barbecued ribs during preliminary treatment and thereafter to cook the ribs in the presence of concentrated barbecue sauce which is deficient in moisture, the cooking being conducted to an extent that a small portion of the natural juices is removed from the meat to supply the deficiency in moisture of the sauce whereby a uniform sauce is provided which does not flow but remains upon the ribs during the final step of heating the ribs for the table. Other specific objects and advantages will appear as the specification proceeds.

Figure 2:
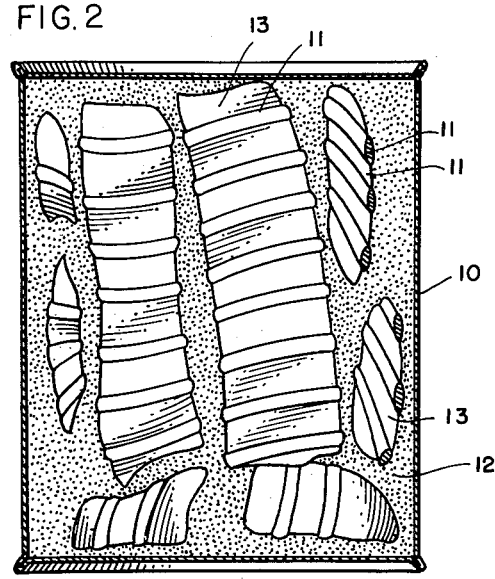

The process is illustrated in a preferred embodiment by the accompanying drawing, in which:

FIG. 1 is a perspective view of a sealed can containing the product; and FIG. 2, a vertical sectional view, on an enlarged scale, showing the product within the can, the section being taken as indicated at line 2—2 of FIG. 1.

In the illustration given, 10 designates a can, which is preferably sealed under vacuum. 11 designates the meat-carrying ribs within the can 10, and 12 designates barbecue sauce carried within the can.

The term "ribs" is applied in the trade to a rib and meat product, such as pork ribs, the ribs being sectioned and carrying with them meat sections 13, as indicated in FIG. 2. The term therefore means not only the ribs 11, but the meat portions 13 extending between the ribs, as shown more clearly in FIG. 2.

In one embodiment of our invention, the ribs, fresh or frozen, are split lengthwise and cured in a pickle solution prepared as follows: To a 40 salometer pickle are added 20 pounds of brown sugar, one pound of sodium nitrate, and one pound of sodium nitrite per 100 gallons. After curing, the ribs are flushed and soaked in tap water and then drained.

The drained ribs are then smoked, using electrostatic means for depositing the smoke on the ribs, so that moisture is not removed. By way of example, the ribs are placed on a conveyor and passed through the electronic smoker, the conveyor traveling at the rate of two feet per minute. In the electrostatic smoker, ionizing electrodes are provided on each side of the ribs and the smoke is applied to the ribs through smoke plenums. The ionizing or polarizing action of the electrodes has the effect of directing the smoke particles into a path intersecting the path of the ribs, so that the smoke is directed toward the rib product for deposition thereon, and in this method of treatment there is no substantial removal of the meat juices.

In the preparation of the barbecue sauce, the free water of the prior formula is eliminated. Instead of employing about 29% of tomato paste (26% solids) with about 44% water, we employ 58% of tomato paste (26% solids) with no added water, and to the paste, which constitutes the main ingredient of the sauce, are added sugar, vinegar, salt, dry spice, and the usual condiments.

The barbecue sauce consists principally of tomato paste and free water is substantially eliminated from the sauce formula.

The barbecue sauce is prepared so as to have a moisture deficiency and is of such a stiff consistency as to require spooning or ladling of the sauce material into the can. Automatic fillers for handling such stiff or rigid material may be used to fill the cans. We prefer that the sauce have a moisture content of about 60–64%, best results being obtained with a moisture content of about 62%.

The concentrated sauce material may be placed in the bottom of the can and the ribs packed into the can, as illustrated in FIG. 2, and the can is then closed and sealed under vacuum.

The sealed cans are then heated, preferably in a steam retort, at a temperature of about 215° F., the heating being continued until an internal temperature of about 188–193° F. is attained, the heating interval requiring usually about two hours. We find that when the ribs are heated in this manner to the internal temperature range described, and preferably to about 190° F., a relatively small amount (8–15%) of natural juice is cooked out of the meat, and this juice is largely picked up by the moisture-deficient sauce to make the sauce soft, readily spreadable but non-flowing. When the can is opened and the ribs removed, the sauce while being soft and readily spreadable remains on the ribs and does not flow away during the heating of the product for the table. Further, the sauce, by reason of the incorporation therein of the juices containing a small amount of fat, is uniform in character and does not stratify or separate during the final heating operation.

In the foregoing operation in which the cans are heated in a steam retort until an internal temperature of about 188–193° F. is attained, we find that the moisture of the sauce increased to about 68–76%, the optimum content being about 72%. The pickup of moisture by the sauce is preferably about 10%, but may be through the wider range of 4–15%. By heating the rib product to attain an internal temperature of 188–193° F., we find that most of the juices which are cooked out of the meat are absorbed by the water-deficient sauce so that in the final product there is a minimum of free liquid, and when the can is emptied the product consists almost entirely of the ribs on which the soft but non-flowing sauce is placed. The meat contains the greater portion of its original natural juices, and of the small portion of juice which is cooked out of the meat, it is found that the greater portion thereof together with volatile portions of the juices are absorbed by the sauce, with the result that all of the sauce may be utilized on the cooked product.

Why the retention of all of the natural juices of the meat through the avoidance of moisture loss in the early processing steps and the utilization of the natural juices for dilution of the sauce to the desired plastic condition brings about the stabilization above described we are unable to state with certainty. We have found, however, that by the use of the new sequence of steps which has been described and which enables the natural juices of the meat to be retained and utilized substantially as the sole means for diluting the sauce in the final product, such separation or stratification does not occur.

The new process may be illustrated by the following specific examples:

Example I

Fresh back ribs were split lengthwise and cured overnight in a pickle consisting of 40 salometer pickle to which 20 lbs. of brown sugar, 1 lb. of sodium nitrate, and 1 lb. of sodium nitrite per 100 gallons were added. After curing, the ribs were flushed and soaked in tap water and then drained properly before being processed further. The ribs were placed on a conveyor and passed through an electronic smoker at the rate of 2 feet per minute and the final smoked product was found to have lost practically none of its natural juices. A sauce formula consisting of 58% tomato paste (26% solids), 2,13% onion powder, 0.50% garlic powder, 12.25% brown sugar, 6.0% salt, 8.0% Worcestershire sauce, 8.0% 100 grain vinegar, and 5.12% dry spice, was placed in a 2½ lb. can with the back ribs, the packing weight being 2 lbs. of ribs to ½ lb. of the barbecue sauce. The cans were sealed under vacuum and placed in a steam retort and heated for 2 hours at a temperature of 215° F. until an internal temperature of 190° F. was attained.

The final product had a pH of 5.5, a salt content of 2.5%, sodium nitrate was present in the proportion of 141 p.p.m., and sodium nitrite was present in the proportion of 14 p.p.m.

Example II

The process was carried out as described in Example I. In a 2½ lb. can, there were placed 2 lbs. of frozen back ribs and 8 ozs. of the barbecue sauce. After cooking to an internal temperature of 189° F., it was found that the sauce, which initially had a moisture content of 62%, had now absorbed juice and fat to have a moisture content of 70%. Of the absorbed material, there were 2½ ozs. of fat and 5½ ozs. of juice. The meat of the ribs was 16.1 ozs., and the bone was 7.9 ozs. The moisture content of the sauce was 70%. Approximately two-thirds of the cooked-out juices from the meat were absorbed by the sauce.

Example III

The process was carried out as described in Example I except that the moisture content of the sauce was 61% and the 8 ozs. of sauce in each can were increased to 15 ozs. by the absorption of the natural juice. The moisture content of the sauce after the cooking operation in the can was about 68%. The meat of the rib product comprised 17.6 ozs., and the bone comprised 10.8 ozs. Approximately three-fourths of the cooked-out fat-containing juice were absorbed by the sauce.

Example IV

The process was carried out as described in Example I except that instead of using fresh back ribs, frozen spareribs were employed. The same results as described above were achieved, the sauce remaining stable and uniform in the final product.

While in the foregoing specification we have set forth procedure and ingredients in considerable detail for the purpose of illustrating embodiments of the invention, it will be understood that such details may be varied widely by those skilled in the art without departing from the spirit of our invention.

We claim:
1. In the process for canning barbecued meat-carrying ribs in barbecue sauce stabilized against separation and flow, the steps of curing the ribs in pickle solution, applying smoke electrostatically to the cured ribs without reducing the natural juices therein, introducing the ribs in pieces into a can together with a sauce consisting principally of tomato paste containing substantially no free water, the sauce being reduced to a moisture content of about 60–64 percent and to a stiff consistency, sealing the can under vacuum, and cooking the ribs and sauce together to an internal temperature of about 188°–193° F. to render about 8–15 percent of the juices of the meat to saturate the same and to bring the moisture content of the sauce to about 68–76 percent while bringing the sauce to a soft, spreadable and non-flowing consistency.

2. In the process for canning barbecued meat-carrying ribs in barbecue sauce stabilized against separation and flow, the steps of curing the ribs in pickle solution, introducing the ribs in pieces into a can together with a sauce consisting principally of tomato paste containing substantially no free water, the sauce being reduced to a moisture content of about 60–64 percent and to a stiff consistency, sealing the can under vacuum, and cooking the ribs and sauce together to an internal temperature of about 188–193° F. to render about 8–15 percent of the juices of the meat to saturate the same and to bring the moisture content of the sauce to about 68–76 percent while bringing the sauce to a soft, spreadable and non-flowing consistency.

References Cited by the Examiner

UNITED STATES PATENTS

| | | | |
|---|---|---|---|
| 2,424,536 | 7/47 | Mayer et al. | 99—187 X |
| 2,653,876 | 9/53 | Hanson et al. | |
| 3,132,029 | 5/64 | Beck | 99—187 X |

OTHER REFERENCES

"The Complete Book of Barbecue & Rotisserie Cooking," 1954, by Jim Beard, published by the Bobbs-Merrill Company, Inc., New York, pages 92 to 95, inclusive. (Copy in Scientific Library, U.S. Pat. Off.)

A. LOUIS MONACELL, *Primary Examiner.*

HYMAN LORD, *Examiner.*